United States Patent [19]
Gugel

[11] 3,930,487
[45] Jan. 6, 1976

[54] HEAT EXCHANGER TUBE TOOL

[75] Inventor: Georg Gugel, Kalchreuth, Germany

[73] Assignee: Siemens Aktiengesellschaft, Munich, Germany

[22] Filed: Dec. 20, 1973

[21] Appl. No.: 426,479

[30] Foreign Application Priority Data
Dec. 22, 1972 Germany............................ 2263148

[52] U.S. Cl................................... 226/91; 226/199
[51] Int. Cl.².......................................... B65H 23/32
[58] Field of Search ....... 226/91, 92, 168, 172, 196, 226/199; 165/81

[56] References Cited
UNITED STATES PATENTS

| | | | |
|---|---|---|---|
| 3,169,576 | 2/1965 | Lee...................................... | 165/81 |
| 3,248,515 | 4/1966 | Gorman............................ | 226/196 X |

Primary Examiner—Richard A. Schacher
Attorney, Agent, or Firm—Kenyon & Kenyon Reilly Carr & Chapin

[57] ABSTRACT

Certain types of heat-exchangers have tubes opening through a tube sheet to a manifold having an access opening offset from alignment with the tube ends. A tool for inserting a device, such as for inspection or repair, is provided for use in such instances. The tool is formed by a flexible guide tube insertable through the access opening and having an inner end provided with a connector for connection with the opening of the tube in which the device is to be inserted, and an outer end which remains outside of the chamber, the guide tube having adequate length for this arrangement. A flexible transport hose for internally transporting the device slides inside of the guide tube. This hose is long enough to slide through the guide tube, into the heat-exchanger tube, and through the latter to the extent required for the use of the device. The guide tube must be bent to reach the end of the heat-exchanger tube and the latter may be constructed with a bend, the hose carrying anti-friction elements at interspaced locations along its length to make it possible for the hose to negotiate such bends while sliding to the location where the use of the device is required.

7 Claims, 4 Drawing Figures

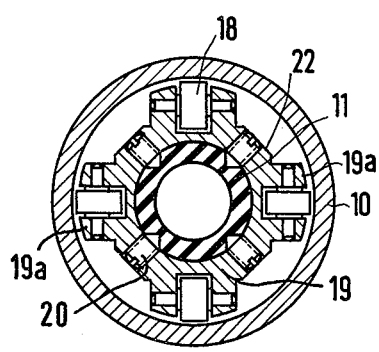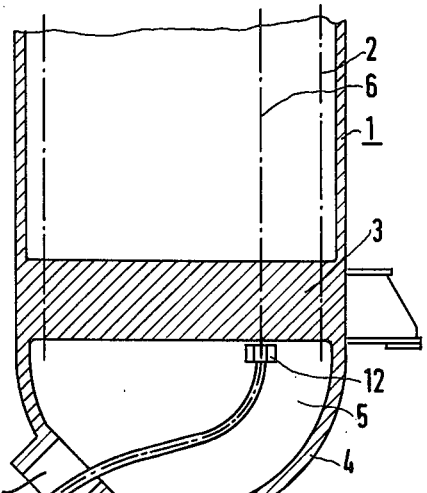
Fig.3
Fig.1
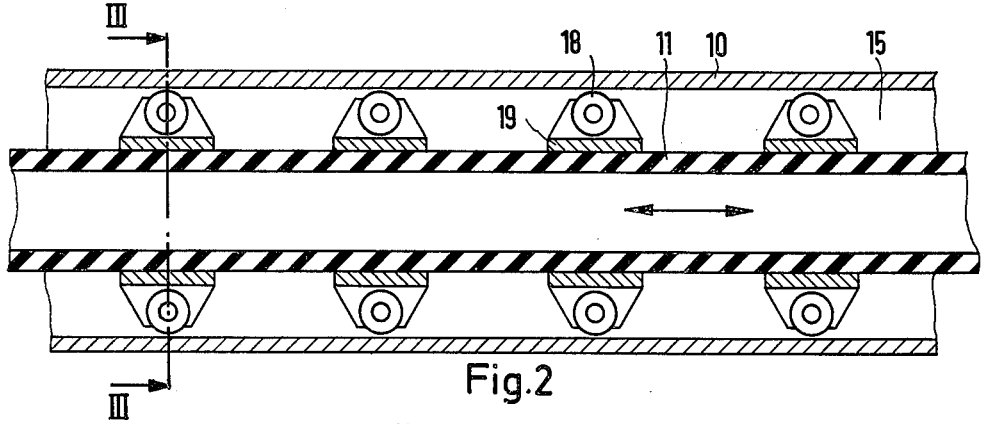
Fig.2
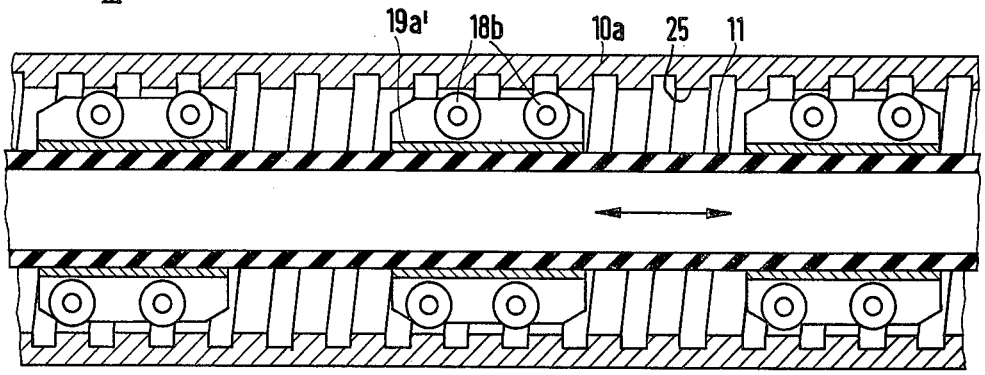
Fig.4

HEAT EXCHANGER TUBE TOOL

BACKGROUND OF THE INVENTION

A pressurized-water reactor power plant facility includes steam generators each having a housing having a lower end closed by a tube sheet in which an inverted U-shaped tube bundle, made of many tubes, has its inlet and outlet legs mounted. Inlet and outlet manifold chambers are positioned below the tube sheet for the tube bundle's inlet and outlet legs, respectively, and these chambers are connected in circuit with the pressurized-water coolant pipe line connected with the reactor and provided with a pump so that the coolant continuously circulates through all of these parts, the tube bundle forming, of course, a heat-exchanger. There is a constant supply of feed water to the steam generator's housing and the latter has a stream output outlet for the steam produced and which represents useable power from the reactor.

The manifold chambers are ordinarily formed by an inverted hemispherical wall having a dividing partition to form the inlet and outlet manifold chambers. Each chamber is provided with a suitably closed manhole or access opening. After the facility has been in operation for a time, the water coolant circulating through the chambers develops a radiation activity which is transmitted to the inside of the chambers and the tubes of the tube bundle.

When considered necessary, the coolant flow through the steam generator is stopped and via the access openings the heat-exchanger's tubes are internally inspected and possibly repaired, this requiring the insertion of a device in one or more of the tube bundle's tubes. Such a device may comprise a miniaturized camera, a fiber-optics rod, and for repair, an explosively expandable plug for putting a faulty tube safely out of service.

Because of the access opening of such a chamber being offset from alignment with the heat-exchanger tube's ends, the insertion of such a device in any one of the tubes has involved an undesirably prolonged exposure of the workman to the radiation activity existing in the chamber, thus presenting a problem requiring a solution.

SUMMARY OF THE INVENTION

The object of the present invention is to provide the above solution.

With this in mind, the invention is a tool for inserting a device into a heat-exchanger tube having an end opening into the chamber having an access opening offset from alignment with the tube's end, the tool being particularly intended for use in connection with a steam generator of the kind described hereinabove, but plainly being useful whenever a corresponding access difficulty is encountered.

The tool is an assembly formed by a flexible guide tube insertable through the access to the heat-exchanger tube's end and having an inner end provided with means for connecting it quickly and easily with the heat-exchanger tube's end, the tube having an outer end and being long enough to permit this outer end to remain safely outside of the chamber when the tube's inner end is connected with the heat-exchanger tube's end. Suitable connecting means are known to the prior art and preferably one of the quick connect and disconnect type is used.

The exposure time of a workman within the chamber is only that necessary for him to move the guide tube into the manifold chamber, bend the tube as necessary, make the quick connection with the end of the tube to be inspected or repaired, and get out of the chamber.

With the guide tube connected, the invention provides a flexible transport hose sliding inside of the guide tube for internally transporting the device to be used, and having a length substantially longer than the length of the guide tube and an outside diameter substantially smaller than the latter's inside diameter. This provides for a circumferential space between the transport tube and the guide tube on the inside of the latter. The flexible transport hose throughout its length has mounts fixed to this outside with each mount forming a plurality of radially extending arms which are interspaced circumferentially with respect to the transport hose, these arms journaling rollers within the space between the tube and hose and which run on the inside of the guide tube whenever necessary to hold the flexible hose spaced from this inside. The mounts are interspaced a distance ranging from one to five times the inside diameter of the guide tube, this interspacing permitting the entire tool to have the flexibility required to negotiate the bends leading to the heat-exchanger tube. Because of the long length of the transport hose it may be pushed through both the guide tube and the heat-exchanger tube, easily negotiating all bends involved and with the anti-friction rolling elements effectively reducing the sliding friction involved by the inner end of the transport hose reaching the location within the heat-exchanger tube where inspection or repair may be required.

At the outer end of the guide tube means powered either manually or by a motor is provided for pushing and pulling the transport hose into and from the guide tube and the heat-exchanger tube. The force required is effectively reduced by the anti-friction elements. Also, the previously mentioned roller mounts may have smooth surfaces formed between the radiating arms, for engagement by rollers or other guiding arrangements such as may extend backwardly to conveniently position the relatively long length of the transport hoses having the interspaced mounts and which must extend a substantial distance away from the outer end of the guide tube.

Both the guide tube and transport hose may be made of any suitable flexible material or construction, and to strengthen the guide tube without making it excessively rigid, its inside wall may be formed with an inwardly extending helical rib throughout its length so that the anti-friction rolling elements can run freely by providing each of the previously referred to mounts with tandem rollers interspaced a distance different from the interspacing between adjacent convolutions of the inner helical rib when this guide tube form is used. With this arrangement at least one of the tandem rollers always can roll on one of the rib convolutions while the other of the tandem rollers spans the space between the convolutions.

The roller mounting arms may comprise only two diametrical arms extending radially from the mount in each instance, but normally at least three arms are provided so that the rollers provide radial anti-friction support for the flexible hose within the guide tube, in all directions. More arms can be used.

3

BRIEF DESCRIPTION OF THE DRAWINGS

The invention is schematically illustrated by the accompanying drawings in which:

FIG. 1 in vertical section shows the bottom portion of a steam generator for a pressurized-water reactor facility, with the tool in use;

FIG. 2 is a longitudinal section showing the guide tube and transport hose with the anti-friction elements each journaling only a single roller on each of its arms;

FIG. 3 is a cross section taken through the line 3—3 in FIG. 2; and

FIG. 4 is a view similar to FIG. 2 but showing the guide tube with the helical internal rib and the tandem roller arrangement for each arm of each mount.

DETAILED DESCRIPTION OF THE INVENTION

Having reference to the above drawings, FIG. 1 shows the bottom portion of the vertical housing 1 of a steam generator of the type previously described, the outer contour of the tube bundle being indicated by the broken lines 2, the bottom tube ends being mounted in the horizontal tube sheet 3 which closes off the bottom of the housing 1. The inverted hemispherical wall is shown at 4 which forms one of the manifold chambers 5. The manhole or access opening 4a is located in the position offset from the tube ends of the tube bundle, and one of these tubes is indicated at 6 by broken lines and it is to be assumed that this tube is the one to be inspected and/or repaired.

The new tool is shown with its flexible guide tube 10 containing the flexible transport tube 11, as being inserted through the access opening 4a with its inner end having the connection 12 which is connected to the bottom end of the heat-exchanger tube 6. The outer end of the guide tube 10 is shown as being provided with a device 14 which, although not shown, may have an internal mechanism, hand or motor powered, for pushing and pulling on the transport hose 11 inside of the guide tube 10.

On an enlarged scale, FIG. 2 shows the guide tube 10 containing the transport hose 11 with the anti-friction rollers 18 which are journaled by the mounts 19 interspaced along the length of the transport hose 11 as previously described.

Reference to FIG. 3 shows that each of the mounts 19 comprises a hub fixed to the transport hose 11 by inwardly pointed set screws 20 with this hub having four radially extending arms 19a which are bifurcated with the rollers 18 journaled between the bifurcated parts.

The inside diameter of the guide tube 10 is made substantially the same as the inside diameter of the heat-exchanger tube into which a device is to be inserted, in this case the tube 6. The outside diameter of the transport hose 11 is substantially smaller than these inside diameters, leaving the radial space available for positioning of the mounts 19 and rollers 18. The described interspacing of the mounts 19, which may be made of rigid material, prevents them from materially interfering with the flexibility of the guide tube 10 and transport hose 11. This space or inside diameter is indicated at 15. The driving device 14 may internally have rollers 14a for guiding the internal parts of the tool, and FIG. 3 shows the smooth running surfaces 22 on which such rollers 14a may run, these surfaces being shown at 22, located between the arms 19a as to each of the mounts 19.

4

FIG. 4 shows the guide tube 10a with the helical internal rib 25 on its inside, the mounts 19a' in this case having the tandem rollers 18a. For the reason previously described, the tandem rollers 18a, as to each set, are interspaced a distance different from that between adjacent convolutions of the rib 25, assuring that one or another of the tandem rollers 18a of each set ride on one or another of the inner surfaces of these convolutions. Excepting for the use of sets of tandem rollers, the construction of FIG. 4 may correspond to that illustrated by FIG. 3.

The use of the tool and its advantages have already been described hereinabove. However, as amplification, the flexible tube 11 has an inside diameter adequate to transport various devides projecting from the inner end of the tube 11 to the desired location. The length of the transport hose 11 is adequate to carry the device to any position within the tube 6, which, although not shown, has the typical top return bend characteristic of the inverted U-shaped tube bundle type of heat-exchanger. The inside of the transport hose 11 has adequate room for carrying a fiber-optic rod bottom, control wires for a miniature camera mounted on the inner end of the transport hose 11, the electrical ignition wires for an explosively expandable tube plug carried on the inner end of the transport hose 11, and the like.

The cross sectioning of the transport hose 11, shown by the drawings, indicates that it may be made of non-metallic material, such as artificial rubber. This permits it to be made with a thick enough wall to transmit both compressive and tensile forces adequate tor the insertion and removal of the transport hose 11 and its mounts and anti-friction elements, to the desired location in the heat-exchanger tube 6. The guide tube 10 may be made of maleable metal, such as lead, it normally being possible to bend the guide tube substantially to the shape required prior to its insertion to the access opening 4a. If made of helically coiled metal strip having interlocking edges which form an internally projecting helical rib, the advantage of the FIG. 4 construction become apparent. If non-metallic material is used for the guide tube 10, there is no restriction on the wall thickness providing the inside diameter is substantially the same as the inside diameter of the heat-exchanger tube, thus permitting a sturdy guide tube, the flexibility of which may be enhanced by the tube wall contour shown by FIG. 4.

What is claimed is:

1. A tool for inserting a device into a pressurized-water reactor steam-generator heat-exchanger tube having an end opening into a chamber having an access opening offset from alignment with said tube's end, said tool comprising a flexible guide tube removably inserted through said access opening and bending to said heat-exchanger tube's end and having an inner end provided with means releasably connecting it with the heat-exchanger tube's end and the guide tube having an outer end, said guide tube having a length such that said outer end remains outside of said chamber, said guide tube having substantially the same inside diameter as said heat-exchanger tube's inside diameter, a flexible transport hose sliding inside of said guide tube for transporting said device and having a length substantially longer than the length of said guide tube and an outside diameter substantially smaller than the latter's inside diameter, and a plurality of anti-friction rolling elements fixed to said transport hose at interspaced positions therealong for bearing on the inside of this guide tube.

2. The tool of claim 1 having means at said guide tube's outer end for driving said transport hose forwardly and backwardly in said guide tube.

3. The tool of claim 1 in which said anti-friction rolling elements are formed by mounts fixed to the outside of said transport hose with each mount forming a plurality of radially extending arms which are interspaced circumferentially with respect to the transport hose and rollers transversely journaled by said arms.

4. The tool of claim 3 in which said arms each journals a plurality of said rollers positioned in tandem.

5. The tool of claim 3 in which said mounts are interspaced a distance ranging from one to five times the inside diameter of said guide tube.

6. The tool of claim 3 in which each of said mounts between its said radial arms forms longitudinally extending smooth running surfaces.

7. The tool of claim 4 in which said guide tube internally has a helically ribbed shape and the interspacing of said tandem rollers is different from the interspacing of mutually adjacent convolutions of said ribs.

* * * * *